(12) United States Patent
Guenthner et al.

(10) Patent No.: US 7,684,973 B2
(45) Date of Patent: Mar. 23, 2010

(54) PERFORMANCE IMPROVEMENT FOR SOFTWARE EMULATION OF CENTRAL PROCESSOR UNIT UTILIZING SIGNAL HANDLER

(75) Inventors: Russell W. Guenthner, Glendale, AZ (US); Stefan R. Bohult, Phoenix, AZ (US); David W. Selway, Phoenix, AZ (US); Clinton B. Eckard, McMinnville, TN (US)

(73) Assignee: Bull HN Information Systems Inc., Chelmsford, MA (US)

( * ) Notice: Subject to any disclaimer, the term of this patent is extended or adjusted under 35 U.S.C. 154(b) by 582 days.

(21) Appl. No.: 11/324,050

(22) Filed: Dec. 29, 2005

(65) Prior Publication Data
US 2007/0156390 A1    Jul. 5, 2007

(51) Int. Cl.
*G06F 9/455* (2006.01)
(52) U.S. Cl. .............................. 703/26; 703/23; 717/134
(58) Field of Classification Search .................... 703/26, 703/27; 714/28; 717/134
See application file for complete search history.

(56) References Cited

U.S. PATENT DOCUMENTS

| | | | | |
|---|---|---|---|---|
| 5,778,211 A | * | 7/1998 | Hohensee et al. | 703/26 |
| 5,832,205 A | * | 11/1998 | Kelly et al. | 714/53 |
| 5,907,708 A | * | 5/1999 | Hohensee et al. | 712/244 |
| 5,995,745 A | * | 11/1999 | Yodaiken | 703/26 |
| 6,173,248 B1 | * | 1/2001 | Brauch | 703/26 |
| 6,397,242 B1 | * | 5/2002 | Devine et al. | 718/1 |
| 7,065,633 B1 | * | 6/2006 | Yates et al. | 712/227 |

OTHER PUBLICATIONS

U.S. Appl. No. 11/174,866, filed Jul. 5, 2005, Guenthner, Russell.
U.S. Appl. No. 11/323,969, filed Dec. 29, 2005, Guenthner, Russell.

* cited by examiner

*Primary Examiner*—Jason Proctor
(74) *Attorney, Agent, or Firm*—Russell W. Guenthner

(57) ABSTRACT

As fast and powerful commodity processors have been developed, it has become practical to emulate on platforms built using commodity processors the proprietary hardware systems of powerful older computers. High performance is typically a key requirement for a system even when built using emulation software. In a hardware design many special cases and conditions which may cause exceptions are detected by logic operating in parallel with the instruction execution. In software these checks can cost extra cycles of processor time during emulation of each instruction and be a significant detriment to performance. Avoiding some of these checks by relying upon the underlying hardware checks of the host system and then using a signal handler and special software to recover from these signals is a way to improve the performance and simplify the coding of the software emulation system.

5 Claims, 8 Drawing Sheets

PERFORMANCE IMPROVEMENT FOR SOFTWARE EMULATION OF CENTRAL PROCESSOR UNIT UTILIZING SIGNAL HANDLER

RELATED APPLICATIONS:

1. U.S. application Ser. No. 11/174,866 titled "Lookahead Instruction Fetch Process for Improved Emulated Instruction Performance" by Russell W. Guenthner et al, filed Jun. 6, 2005 bearing and assigned to the same Assignee as the present application 2. U.S. application Ser. No. 11/323,969 titled "Reliability Improvement using Signal Handler for Fault Recovery in Software Emulator" by Russell W. Guenthner et al, filed Jun. 6, 2005 bearing and assigned to the same Assignee as the present application.

FIELD OF THE INVENTION

This invention relates to the art of computer system emulation and, more particularly, to a host computer system in which the instruction set of legacy system hardware design is emulated by a software program to thus preserve legacy systems and software. More particularly, this invention relates to improving the reliability, availability and serviceability of a software emulator by utilizing host system hardware and software and a signal handler to detect and initiate recovery from certain software faults in the emulator.

BACKGROUND OF THE INVENTION

Users of obsolete mainframe computers running a proprietary operating system may have a very large investment in proprietary application software and, further, may be comfortable with using the application software because it has been developed and improved over a period of years, even decades, to achieve a very high degree of reliability and efficiency.

As manufacturers of very fast and powerful "commodity" processors continue to improve the capabilities of their products, it has become practical to emulate the proprietary hardware and operating systems of powerful older computers on platforms built using commodity processors such that the manufacturers of the older computers can provide new systems which allow their customers to continue to use their highly-regarded proprietary software on state-of-the-art new computer systems by emulating the older computer in software that runs on the new systems.

Accordingly, computer system manufacturers are developing such emulator systems for the users of their older systems, and the emulation process used by a given system manufacturer is itself subject to ongoing refinement and increases in efficiency and reliability.

Some historic computer systems now being emulated by software running on commodity processors have achieved performance which approximates or may even exceed that provided by legacy hardware system designs. An example of such hardware emulation is the Bull HN Information Systems (descended from General Electric Computer Department and Honeywell Information Systems) DPS 9000 system which is being emulated by a software package running on a Bull NovaScale system which is based upon an Intel Itanium 2 Central Processor Unit (CPU). The 64-bit Itanium processor is used to emulate the Bull DPS 9000 36-bit memory space and the GCOS 8 instruction set of the DPS 9000. Within the memory space of the emulator, the 36-bit word of the "target" DPS 9000 is stored right justified in the least significant 36 bits of the "host" (Itanium) 64-bit word. The upper 28 bits of the 64-bit word are typically zero for "legacy" code. Sometimes, certain specific bits in the upper 28 bits of the containing word are used as flags or for other temporary purposes, but in normal operation these bits are usually zero and in any case are always viewed by older programs in the "emulated" view of the world as being non-existent. That is, only the emulation program itself uses these bits.

In the development of the emulator system, careful attention is typically devoted to ensuring exact duplication of the legacy hardware behavior so that legacy application programs will run without change and even without recompilation. Exact duplication of legacy operation is highly desirable to accordingly achieve exactly equivalent results during execution.

In order to achieve performance in an emulated system that at least approximates that achieved by the legacy system hardware, or in more general terms, in order to maximize overall performance, it is necessary that the code that performs the emulation be very carefully designed and very "tightly" coded in order to minimize breaks and maximize performance. These considerations require careful attention to the lowest level design details of the host system hardware, that is, the hardware running the software that performs the emulation. It also requires employing as much parallelization of operations as possible.

An Intel Itanium series 64-bit CPU is an excellent exemplary platform for building a software emulator of a legacy instruction set because it offers hardware resources that enable a high degree of potential parallelism in the hardware pipeline of the Itanium CPU. The Itanium CPU also provides instructions that allow for fast decision making and guidance by the software as to the most likely path of program flow for a reduction in instruction fetch breaks and overall improved performance. In particular, the Itanium architecture provides instructions that allow preloading of a "branch register" which informs the hardware of the likely new path of the instructions to be executed, with the "branch" instruction itself actually happening later. This minimizes the CPU pipeline breaks that are characteristically caused by branch instructions, and allows for typically well predicted branch instructions to be processed efficiently without CPU pipeline breaks wasting cycles. The branch look-ahead hardware of the Itanium CPU, and in particular a specific mechanism for loading and then using a branch register, allows for the emulation software to achieve a higher degree of overlap and, as a result, higher performance in emulated legacy system instruction processing.

Reference may be taken to U.S. application Ser. No. 11/174,866 entitled "Lookahead Instruction Fetch Process for Improved Emulated Instruction Performance" by Russell W. Guenthner et al, filed Jun. 6, 2005, and assigned to the same Assignee as the present application for a more complete exposition of the advantages of selecting a host processor having the characteristics of the Intel Itanium series processors for emulating legacy software.

The development of software which provides for emulation of the legacy software instruction set on the host machine is complicated, and the requirements on performance are extreme. An approach which allows for ease of development and also provides the ultimate performance is to develop the code first in a high-level language, and then once the functionality and approach are precisely defined, to develop analogous code in assembly language. Because of the complexity it is also probable that in a final product some of the source code will be in assembly and some will be in a more easily maintained and understood higher level language such as "C" or "C++".

Two major requirements of the emulation software are 1) to achieve precise and exact emulation of the legacy instruction set, and 2) to achieve the highest possible performance. These two requirements are sometimes conflicting.

In any software emulation of hardware there are pieces of code which are concerned with checking for error conditions and exceptions. Since performance is critical the code must be carefully crafted to avoid "wasting" unnecessary time doing all the checks that the legacy system hardware might have done in parallel with other operations. Checking in software for the many exceptions that may have been detected by the legacy hardware takes extra code, is time-consuming and is a potentially significant detriment to performance.

The emulation software runs on a machine called the host system. The host system is itself a computer system which has its own exception and fault checking mechanisms built into the host system hardware and if used, also in the operating system of the host system. The exceptions and checks may be similar or quite different from the legacy system being emulated. These exceptions typically must be avoided by writing the emulation software so that it does not typically fault or do things which would cause system or application program errors.

If an error is detected by the host system hardware and operating system software there are typically two options for "handling" the error condition. Typically, the application program is aborted. In more advanced systems, a mechanism commonly called a "signal handler" may be invoked by a coordinated response of host system's operating system and the underlying hardware upon which it is running. In any operating system these pieces of code are typically quite machine dependent. The signal handler is code that is invoked on behalf of the application program when specifically selected hardware or system errors are detected. This gives the application programmer a chance to recover or process the host system detected errors in any desired way and is a much improved alternative to simply aborting the program.

SUMMARY OF THE INVENTION

The present invention recognizes that the above same signal handling approach can also be utilized not just for handling exceptions, but also as a detection mechanism for infrequent events that are time-consuming and time-wasting to check in the normal code of the software emulator. If the underlying host system hardware detection mechanisms for certain special cases can be utilized as an alternative to actually checking for these conditions in the code of the software emulator, and if complete compatibility with the legacy system can be maintained, then this approach can result in faster and more efficient coding for the most time critical portions of the software emulator.

Objects of the Invention

Accordingly it is an object of the present invention to provide a solution and methodology within a computer system hardware emulation that allows for the signal handler of the host system hardware and operating system to be utilized by the software emulation program with the objective of improving performance of the emulation and in addition improving the stability and reliability of the software emulation program itself. This object is achieved in a maimer such that the checking for selected special conditions that would normally be required of the software emulation code in the method of the prior art would be left unchecked by the software emulation program. These certain special conditions arc now instead detected and caught by the host system hardware and software. Then, control is passed back to the emulation software program in a manner such that proper processing and recovery from the exception in the manner of the emulated legacy system hardware would take place.

This solution allows certain checking by the software emulation program to be unnecessary in the normal emulation software and allows for increased performance in the overall emulation. Thus, the present invention achieves a performance improvement by providing an integrated approach to the emulation of the legacy system machine instructions utilizing the signal handling of the host system hardware to detect certain special conditions and thus save the time for checking for these conditions in the software emulation program itself which is a main object of this invention.

The above objects and advantages are achieved in an illustrated embodiment of the present invention which includes an apparatus for emulating in software the hardware and operations of a legacy or target computer system. The apparatus includes a host system having a host central processing unit, a host memory including a target system memory and a signal handler which is given control of a host software emulation program following a host system hardware detected exception condition. The apparatus is used to emulate the processing of one of a series or plurality of legacy system instructions, If an exception condition is detected by the host system hardware, a signal handler is invoked. The signal handler includes a first mechanism for returning control to the host software emulation program and the apparatus further includes a second mechanism within the emulation program for taking control from the signal handler, and recovering from the exception such that the emulation of the legacy system instruction is performed in the same manner as if performed by the legacy hardware system. The approach of the present invention avoids the need for having to perform checks for potential exceptions as art of the "normal" or first code of the software emulator utilized prior to the host system hardware exception and allows for improved performance of the emulator by performing those checks in second emulation code only when necessary.

By way of additional background, it is noted that when the emulated legacy system is a large mainframe handling multiple programs simultaneously and continuously, the selection and subsequent control of the emulator is not trivial. Software emulation of a hardware system requires that the software emulation appear to act like hardware in that it switches between and performs many tasks for many users or programs simultaneously. The same software emulation system which is utilized to run a user's job, is also simultaneously used to emulate the processing of instructions for both the operating system and the I/O system. In a large system with multiple users, the same emulation software is used to process jobs from many users, threads, or processes. The software emulation of the "hardware" switches rapidly between the tasks to be done, and as a result spends small slices of time processing many users jobs, threads, or processes.

If errors exist in the coding of the software emulation software, it may be possible that the coding errors will affect only the results of the software emulation of a specific application program and not the higher level operating system or I/O system. The erroneous coding may affect only a single user and not other users. In this case system reliability can be increased by detecting these conditions and in response to such detection aborting only the job for that user application rather than the entire emulation software program, which could potentially bring down the entire emulation system, operating system and all components. This should be avoided if possible without taking any large risk or sacrifice of system data integrity.

The present invention recognizes that this same hardware detection mechanism can also be utilized in another way for the purpose of increasing the performance of the software emulation of the legacy computer system. The hardware detection mechanisms and the error conditions that are checked by the hardware of the host system are in many cases similar to the exceptions normally checked in the legacy system hardware. By devising a way to utilize the hardware exception detection of the host system to catch and detect certain errors in a manner such that the software emulation can avoid specific checks for these errors in the time-critical portions of code, then overall performance of the software emulator can be significantly improved.

An example of a check for which this approach of the present invention can be applied and for which performance can be increased is the hardware detection of a " divide check". A " divide check" is a commonly used term in the computer industry which means that an attempt has been to tell the hardware to divide by zero. Dividing by zero is potentially a hazard in programming because a divide by zero is a result which should have a quotient with value of infinity. Typically, without a signal handler, a division by zero will cause the operating system to abort any program which executes a hardware divide instruction and encounters and a divisor with value zero. This is true for both integer and floating point divides. With a signal handler in place however, the application program is given the opportunity to recover from such a fault and to return to normal processing.

The recovery mechanism operation includes an examination of the host system hardware fault including potentially its type, the location of the faulting instruction, the operand data and other similar machine related items. These conditions can be examined, and if the exception is detected during processing of legacy operating system code where an unchecked action by the software emulator that may fault is found, then control can be given to the software emulator for faulting or recovery in the manner of the legacy system. In the example of the divide check, the legacy system may itself take a fault which can be emulated by the software emulator, or the fault may be ignored so normal emulation with of the next legacy instruction proceeds, or the legacy operating system itself may have a recovery mechanism that should be invoked by the software emulator in a manner akin to that of legacy system hardware.

In the Intel Itanium 2 processor which is the environment for the implementation of the exemplary machine for this invention the assembly language for the machine provides access to hardware registers which allow for the precise location of a hardware fault to be determined and that information given, typically by the operating system, to the software emulation program.

Further consideration as to the specifics of any fault may also be important in the decision as to whether to recover the emulation of the legacy instructions for a specific program, to abort a user application, or to abort the entire emulation process. An example of this would be in analysis of what is commonly called a "segmentation error" by a program which is an access outside the boundaries of memory that are allowed to it. A segmentation error that was attempting to "read" a location in memory outside of its boundaries might be deemed less likely to have corrupted critical system memory components than a segmentation error that signals an attempt to write or "store" into that memory location. In general, the memory location of the host system instruction that caused the fault, and the module of the software emulator to which it belongs will precisely identify the needed response.

It should be noted that a common approach of the prior art in the C programming language is to use the constructs called "throw" and "catch" and "try" to isolate and respond to potential error conditions. Although this approach will work functionally, in all commercial implementations of C and C++ it is far to expensive to use this approach in time critical portions of the software emulator for this purpose.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENT(S)

Figure 1:
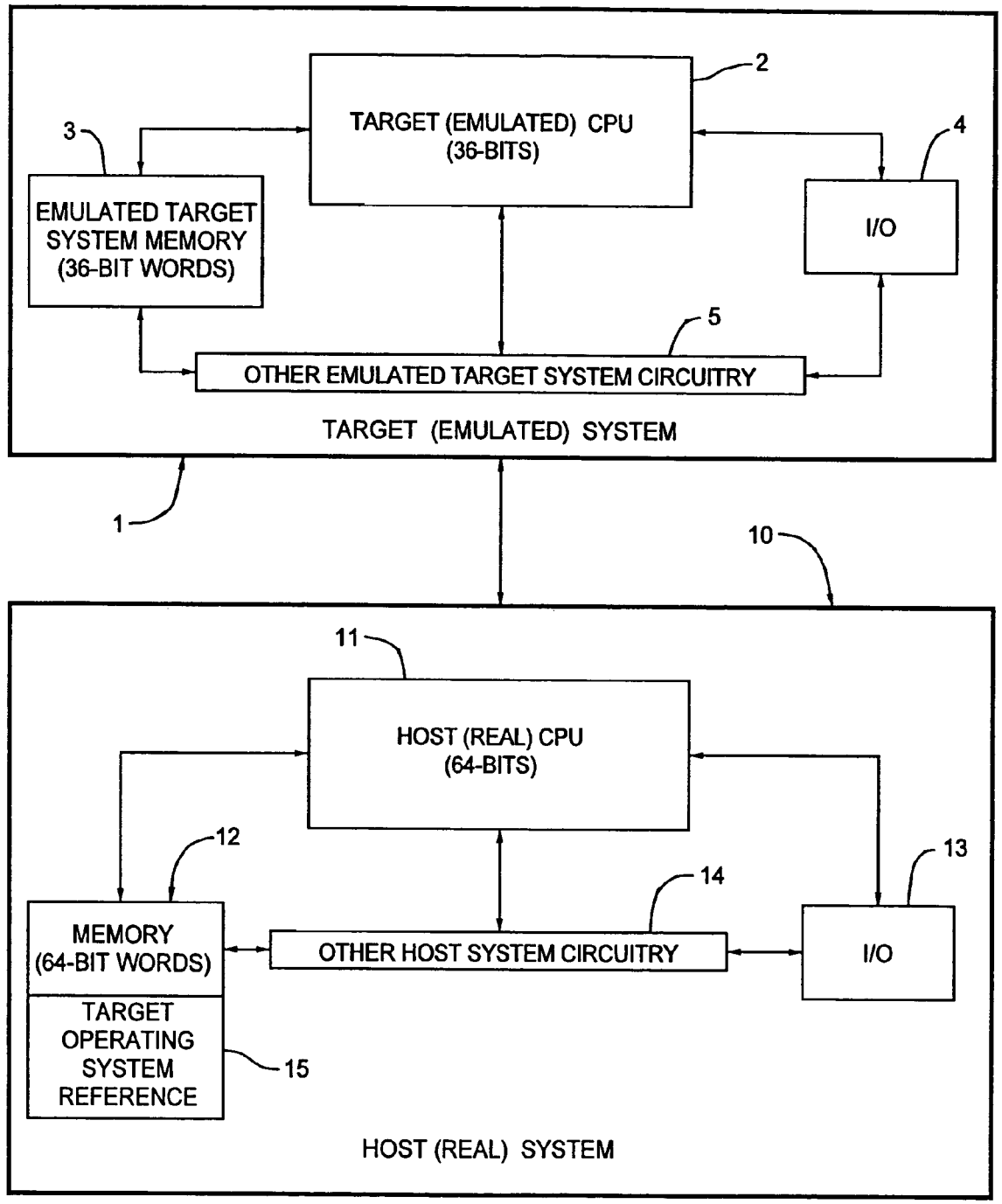
FIG. 1 is a high-level block diagram showing a "host" system emulating the operation of a legacy system, running legacy software.

FIG. 1 illustrates an exemplary environment in which the invention finds application. More particularly, the operation of a target (emulated) "legacy" system is emulated by a host (real) system 10. The target system 1 includes an emulated central processing unit (CPU) 2 (which may employ multiple processors), an emulated memory 3, emulated input/output (I/O) 4 and other emulated system circuitry 5. The host (real) system 10 includes a host CPU 11, a host memory 12, host I/O 13 and other host system circuitry 14. The host memory 12 includes a dedicated target operating system reference space 15 in which the elements and components of the emulated system 1 are represented.

The target operating system reference space 15 also contains suitable information about the interconnection and interoperation among the various target system elements and components and a complete implementation in software of the target system operating system commands which includes information on the steps the host system must take to "execute" each target system instruction in a program originally prepared to run on a physical machine using the target system operating system. It can be loosely considered that, to the extent that the target system 1 can be said to "exist" at all, it is in the target operating system reference space 15 of the host system memory 12. Thus, an emulator program running on the host system 2 can replicate all the operations of a legacy application program written in the target system operating system as if the legacy application program were running on a physical target system.

In a current state-of-the-art example chosen to illustrate the invention, a 64-bit Intel Itanium series processor is used to emulate the Bull DPS 9000 36-bit memory space and the instruction set of the DPS 9000 with its proprietary GCOS 8 operating system. Within the memory space of the emulator, the 36-bit word of the DPS 9000 is stored right justified in the least significant 36 bits of the "host" (Itanium) 64-bit word during the emulation process. The upper 28 bits of the 64-bit word are typically zero; however, sometimes, certain specific bits in the "upper" 28 bits of the "containing" word are used as flags or for other temporary purposes. In any case, the upper 28 bits of the containing word are always viewed by the "emulated" view of the world as being non-existent. That is, only the emulation program itself uses these bits or else they are left as all zeroes. Leaving the bits as all zeroes can also be a signal to the software emulator that it is "emulating" a 36-bit instruction, and the non-zero indication would signal a 64-bit instruction.

Figure 2:
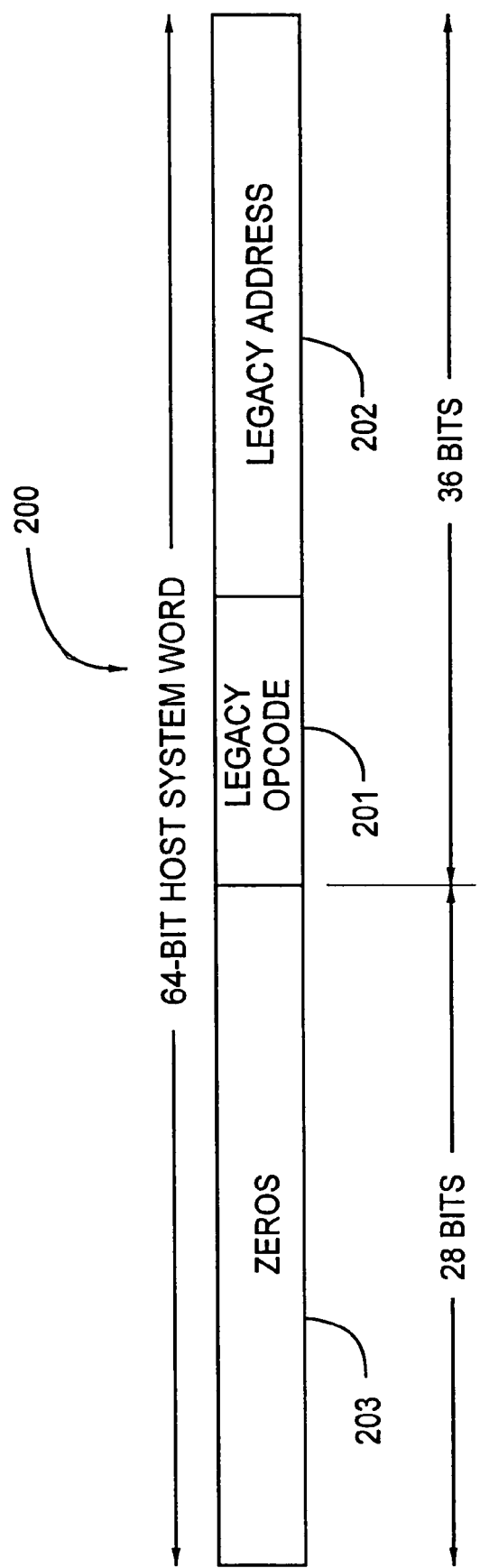
FIG. 2 shows the format of an exemplary simple legacy code instruction that is emulated by emulation software on the host system.

FIG. 2 shows, in a 64-bit host system word 200, the format of a simple 36-bit legacy code instruction word which includes an opcode field 201 and an address or operand field 202 and unused bits which are zeroes 203. Those skilled in the art will appreciate that an instruction word can contain several fields which may vary according to the class of instruction word, but it is the field commonly called the "opcode" which is of particular interest in explaining the present invention. The opcode of the legacy instruction is that which controls the program flow of the legacy program being executed. As a direct consequence the instruction word opcode of each sequential or subsequent legacy instruction controls and determines the overall program flow of the host system emulation program and the program address of the host system code to process each legacy instruction. Thus, the legacy instruction word opcode and the examination and branching of the host system central processor based on the opcode is an important and often limiting factor in determining the overall performance of the emulator. The decision making to transfer program control to the proper host system code for handling each opcode type is unpredictable and dependent on the legacy system program being processed. The order of occurrence and the branching to handle any possible order of instruction opcodes is unpredictable and will often defeat any branch prediction mechanism in the host system central processor which is trying to predict program flow of the emulation program.

Figure 3:
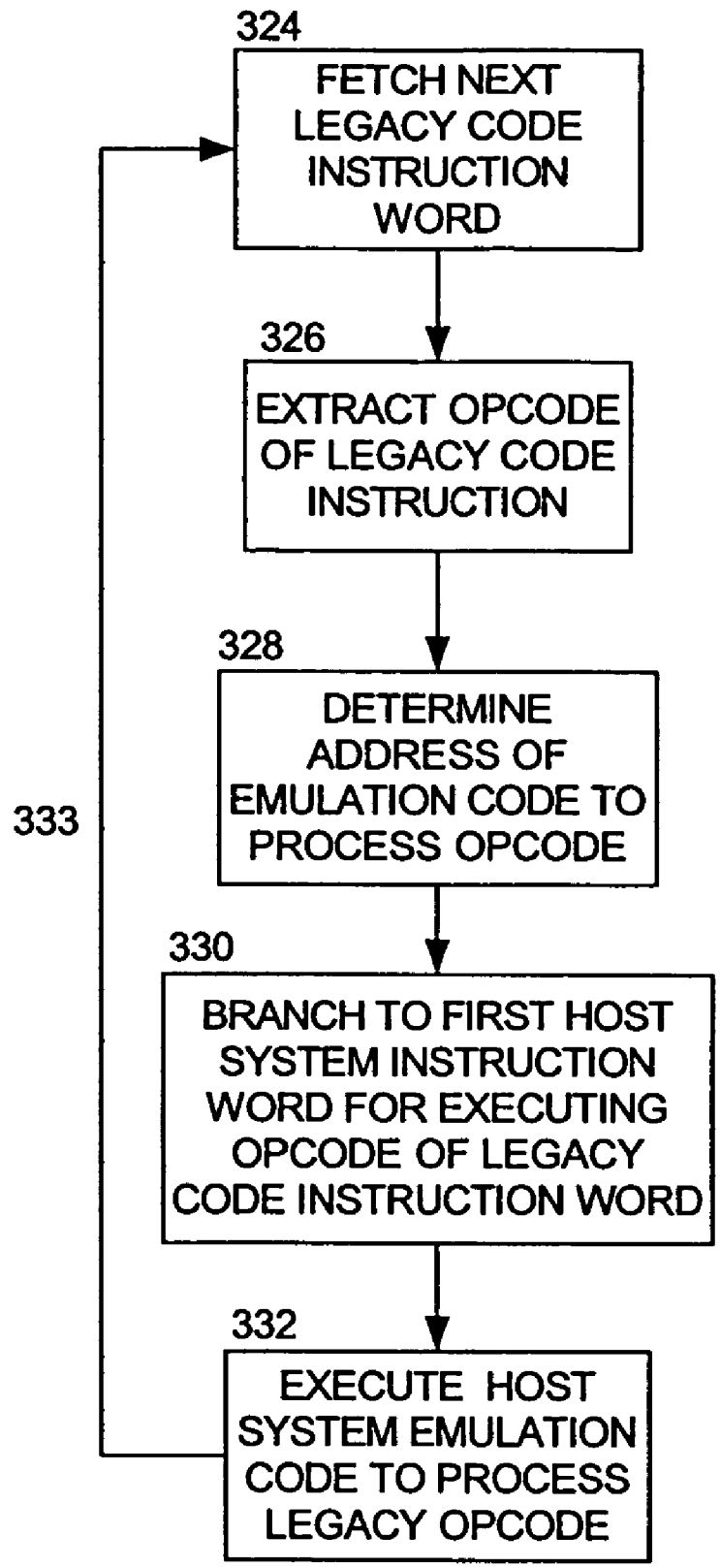
FIG. 3 is a simplified flow chart showing the basic approach to emulating legacy software in a host system.

FIG. 3 is a simplified flow chart showing the basic approach to emulating legacy software in a host system. As a first step 324 an emulated instruction word, the legacy code instruction word, is fetched from host system memory. The emulated instruction word is decoded by the emulation software including the extraction of the opcode 326 from the instruction word. This opcode is used to determine the address of the code within the emulation software 328 which will be selected to process that specific opcode. This determination can be made in many ways well known in the art of computer programming. For example, the address can be looked up in a table indexed by the opcode, with the table containing pointers to the routine that will process that particular instruction. An alternative is to arrange the processing code in host system memory such that the address of each piece of opcode processing code can be calculated, rather than looked up in a table. A second alternative commonly used in the high level "C" programming language is to use a "switch" statement to select between alternate execution paths. A third alternative is to use a table of addresses which point to subroutines or functions, and to use the table to look up the address and the make a call to the proper subroutine based upon that address. This third alternative is particularly efficient when the lower level subroutines for handling a specific opcode are written in either "C" or assembly. Continuing as shown in FIG. 3, once the address of the code to process a specific opcode is selected, a branch to the code selected is made 330 with that branch being either a call instruction if the code is implemented as a subroutine, or a simple branch if the code is in the same routine as the branch itself. Then, the actual code to process the instruction as determined by the opcode is executed 332. Finally, once that instruction is processed the code begins the processing of the next instruction 333.

It is noted at this point that in actual practice the steps shown in FIG. 3 are overlapped and performed in parallel. It is also noted that the fetching of the next instruction, and even several instructions ahead can also be performed in parallel with the processing of any particular opcode or instruction. This prefetch and preprocessing by emulation software code is analogous to that performed in hardware when a machine is implemented in real hardware gates and not the emulation software of the subject invention.

Figure 4:
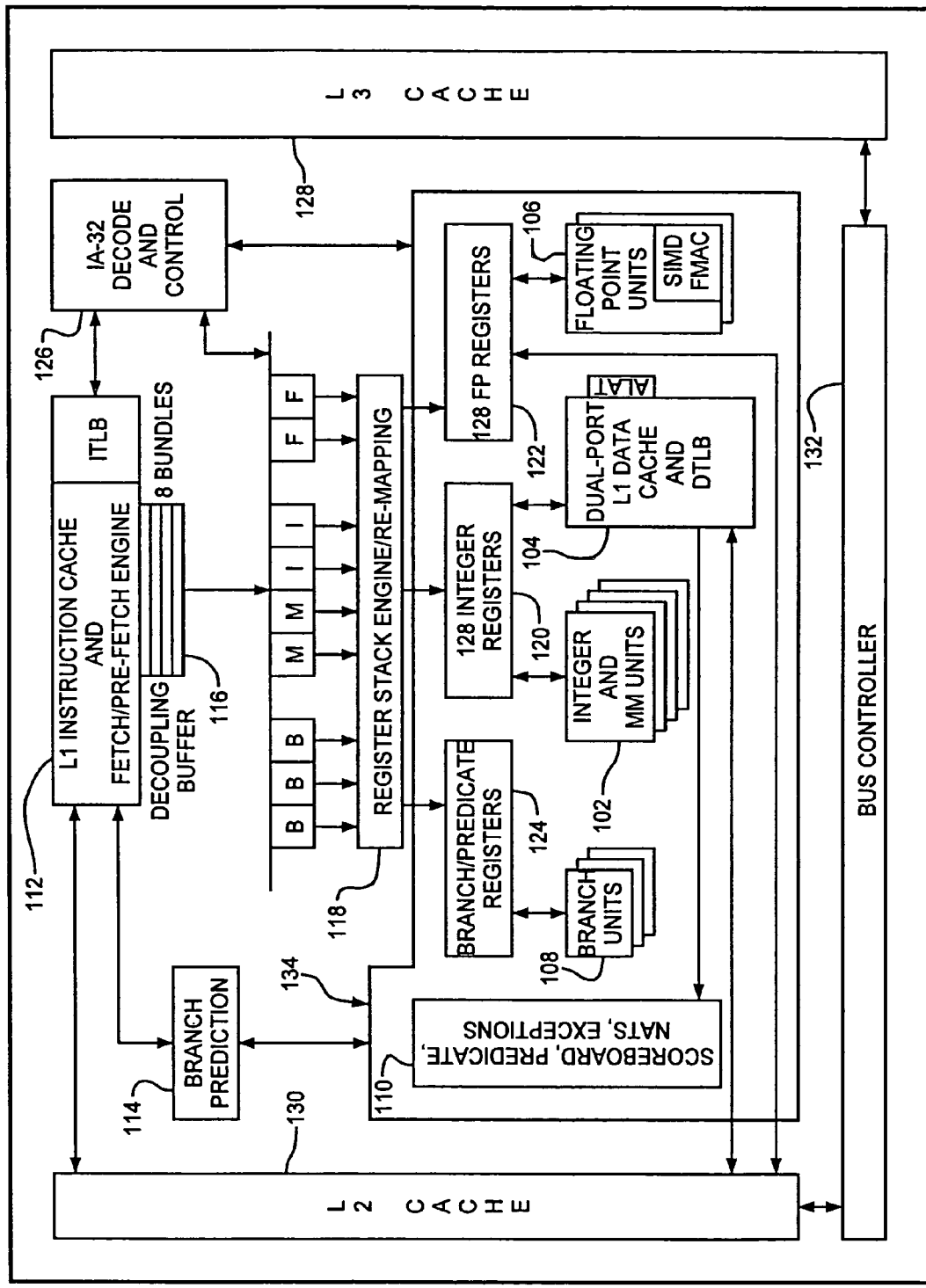
FIG. 4 is block diagram of a host system processor that is well adapted for use in practicing the present invention.

The subject invention can be practiced in host CPUs of any design but is particularly effective in those which include branch prediction registers which assist the hardware in handling branches and also benefits from CPUs employing parallel execution units and having efficient parallel processing capabilities. It has been found, at the state-of-the-art, that the Intel Itanium series of processors is an excellent exemplary choice for practicing the invention. Accordingly, attention is directed to FIG. 4 which is a block diagram of an Intel Itanium processor which will be used to describe the present invention.

The CPU 100 employs Explicitly Parallel Instruction Computing (EPIC) architecture to expose Instruction Level Parallelism (ILP) to the hardware. The CPU 100 provides a six-wide and ten-stage pipeline to efficiently realize ILP.

The function of the CPU is divided into five groups. The immediately following discussion gives a high level description of the operation of each group.

Instruction Processing: The instruction processing group contains the logic for instruction prefetch and fetch 112, branch prediction 114, decoupling coupler 116 and register stack engine/remapping 118.

Execution: The execution group 134 contains the logic for integer, floating point, multimedia, branch execution and the integer and floating point register files. More particularly, the hardware resources include four integer units/four multimedia units 102, two load/store units 104, two extended precision floating point units and two single precision floating point units 106 and three branch units 108 as well as integer registers 120, FP registers 122 and branch and Predicate registers 124. In certain versions of the Itanium 2 architecture, six of the execution units can be utilized by the CPU simultaneously with the possibility of six instructions being started in one clock cycle, and sent down the execution pipeline. Six instructions can also be completed simultaneously.

Control: The control group 110 includes the exception handler and pipeline control. The processor pipeline is organized into a ten stage core pipeline that can execute up to six instructions in parallel each clock period.

IA-32 Execution: The IA-32 instruction group 126 group contains hardware for handling certain IA-32 instructions; i.e., 32-bit word instructions which are employed in the Intel Pentium series processors and their predecessors, sometimes in 16-bit words.

Three levels of integrated cache memory minimize overall memory latency. This includes an L3 cache 128 coupled to an L2 cache 130 under directive from a bus controller 130. Acting in conjunction with sophisticated branch prediction and correction hardware, the CPU speculatively fetches instructions from the L1 instruction cache in block 112. Software-initiated prefetch probes for future misses in the instruction cache and then prefetches specified code from the L2 cache into the L1 cache. Bus controller 132 directs the information transfers among the memory components.

The foregoing will provide understanding by one skilled in the art of the environment, provided by the Intel Itanium series CPU, in which the present invention may be practiced. The architecture and operation of the Intel Itanium CPU processors is described in much greater detail in the Intel publication "Intel® Itanium® 2 Processor Hardware Developer's Manual" which may be freely downloaded from the Intel website and which is incorporated by reference herein.

The Itanium 2 is presently preferred as the environment for practicing the present invention, but, of course, future versions of the Itanium series processors, or other processors which have the requisite features, may later be found to be still more preferred.

Figure 5:
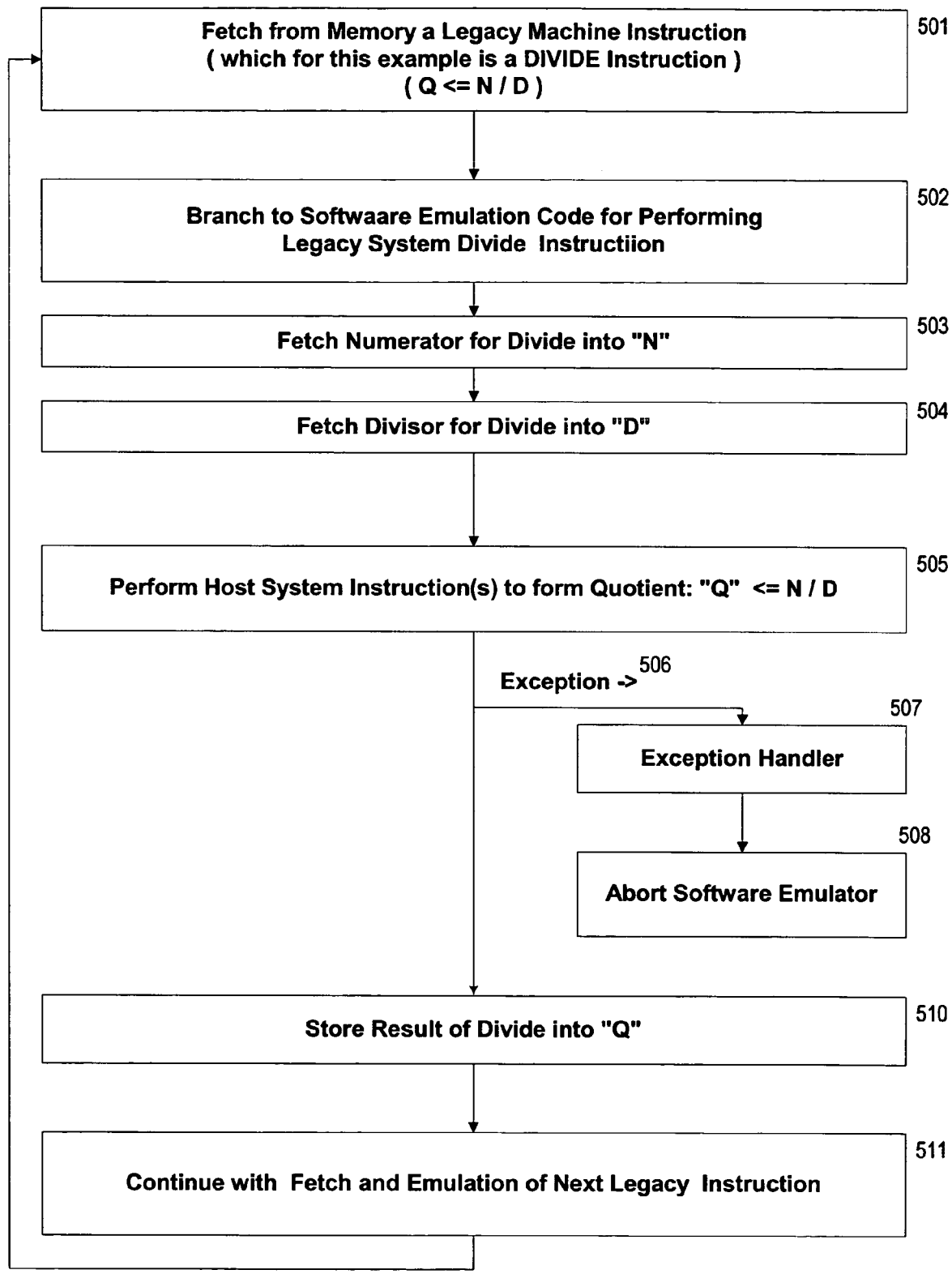
FIG. 5 is flow diagram illustrating the pseudo-code of exemplary emulation software executing a host system divide instruction as part of the processing for one specific legacy system machine instruction.

FIG. 5 is a flow diagram illustrating the pseudo-code of exemplary emulation software executing a host system divide instruction as part of the processing for one specific legacy system machine instruction. In this example the legacy instruction fetches two operands N and D, divides N by D and places the result into Q. The actual divide operation is performed by a host machine instruction, or sequence of instructions which divide two integer numbers. The host system divide instruction will typically "fault" if the divisor D is a zero. Without any signal handler or recovery mechanism in place which is the case for this example, the software program, which is the software emulator, will be aborted.

Referring to FIG. 5, the first step 501 is the fetch of the next legacy instruction which for this example is a divide instruction that on the legacy hardware platform would perform the function Q<=N divided by D, where Q, N, and D are integers. The opcode of the legacy instruction is discovered to be the divide instruction, and the software emulator takes a branch 502 to the code for performing the legacy system divide instruction. This code fetches both the numerator 503 and the denominator 504. Without checking, the host system code is instructed by the machine language of the software emulator to perform the instructions which do a divide operation 505 as an machine instruction on the host system hardware. If there is any exception 506, the exception handler 506, also known as the signal handler, receives control 507, which in this example is when a divide check occurs. If this or any other exception occurs the software emulator is aborted 508. If there is no exception, the signal handler does not gain control and the software emulator will proceed to complete the instruction emulation by storing the result of the divide instruction into "Q" 510 and then continue 511 in normal fashion with the fetch and emulation of the next legacy instruction.

Figure 6:
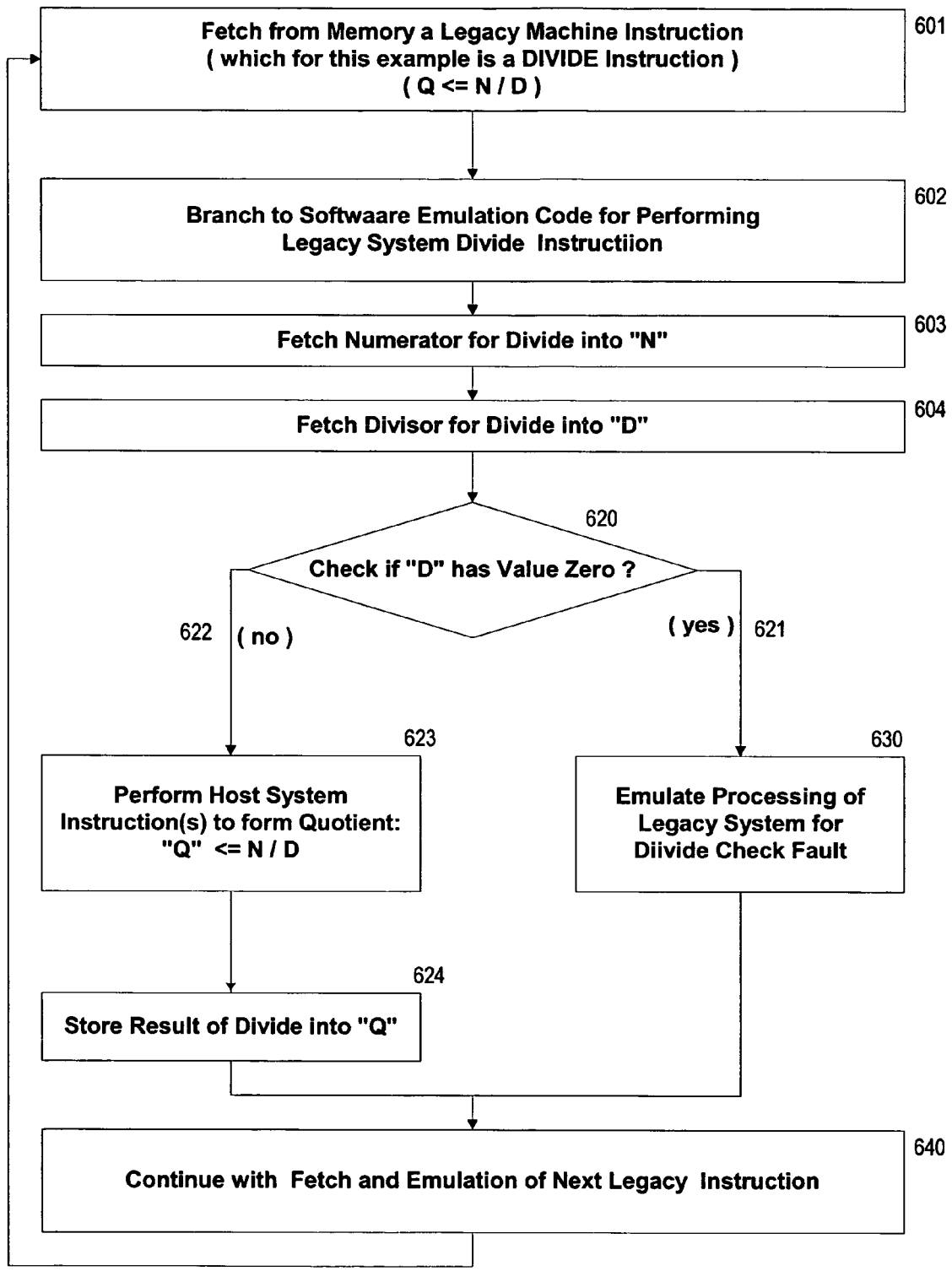
FIG. 6 is a flow diagram illustrating checking of a potential condition that may cause a hardware fault before the host system instruction that may fault is executed.

FIG. 6 is a flow diagram illustrating the checking for a condition that may potentially cause a hardware fault before the host system instruction that may take the fault is executed. The legacy machine instruction is fetched from memory and found to be a divide instruction 601. A branch is taken 602 by the software emulation code to the code for performing the emulation of the legacy system divide instruction. The numerator "N" is fetched 603, and the denominator "D" is fetched 604. In this example the software emulation code then includes a step 620 which checks the divisor D for value zero. If the divisor is not zero 622, then the divide is performed using a host system divide instruction 623 and the result is stored into "Q" 624, and emulation of the legacy instruction processing 640 continues. If a value of zero is found for the divisor 621, the software emulation branches to code 630 which emulates the behavior of the legacy system when that specific legacy instruction encounters a divisor of value zero. This avoids the taking of an unexpected exception on the host system hardware, but has the disadvantage of being slower for normal processing, because of the time for checking, when the exception condition does not occur. Once the emulation of the legacy system instruction is complete the emulation continues 640 with the next legacy instruction. Since the frequency of occurrence of these exceptions is typically very, very low this approach is slower than what could be achieved with an alternative approach.

Figure 7:
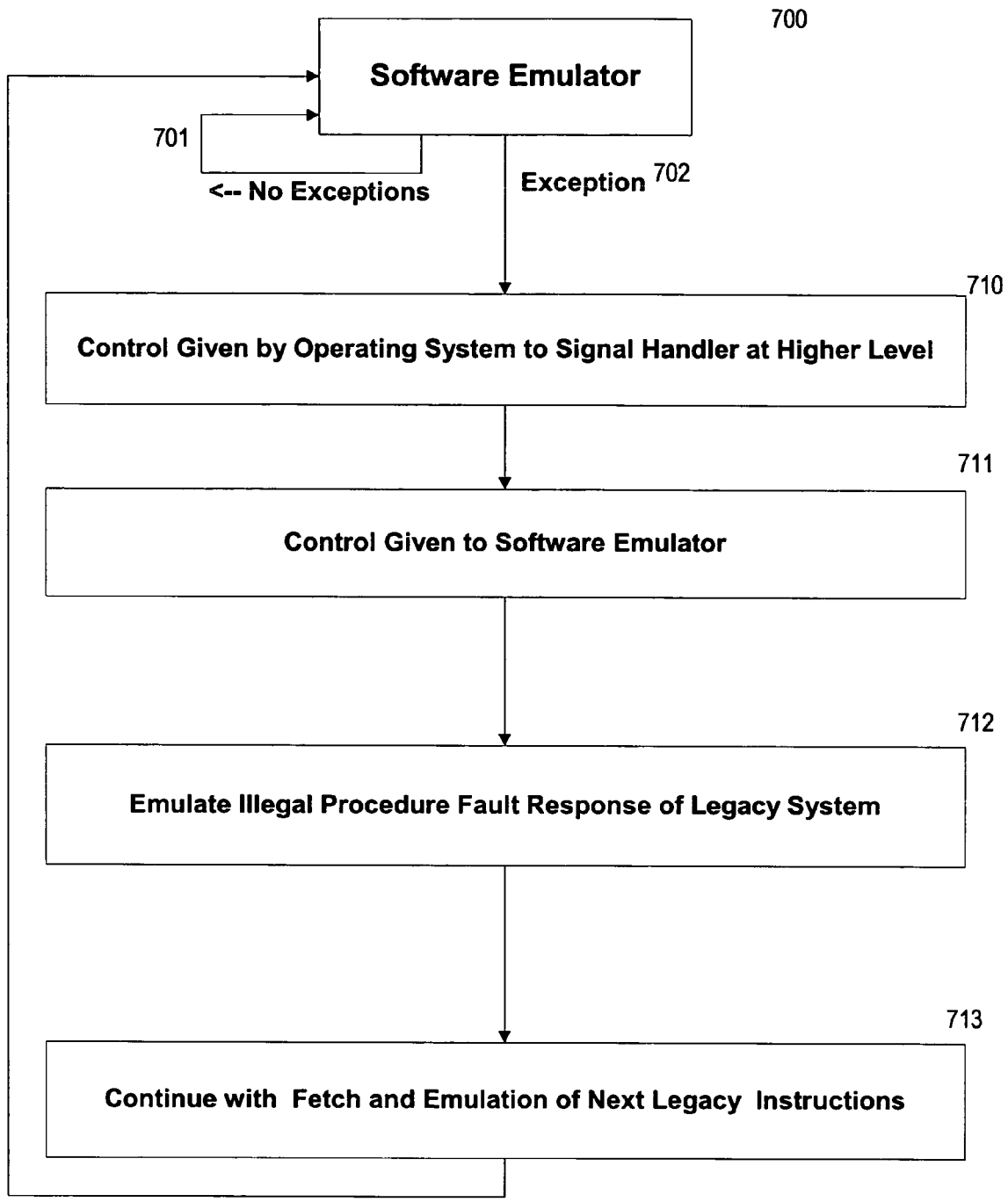
FIG. 7 is a flow diagram illustrating the recovery from a hardware special case condition that was not checked but which was caught by a higher level signal handler.

FIG. 7 is a flow diagram of an alternative approach illustrating the recovery from a hardware special case condition that was not checked but which was caught by a higher level signal handler. In this flow diagram the instruction that is being emulated at the time of the exception is aborted, but the emulation itself is resumed. That is, the emulation system performs in the manner of the legacy system when some type of illegal condition is encountered. The emulation of machine instructions continues so that the legacy operating system now has control of what will be the overall system response. The software emulation in normal operation is marked as 700. As long as no exception occurs 701 the software emulation continues normal emulation of the legacy instructions. If an exception does occur 702 control is given 710 to the operating system's signal handler which is at a higher level. The signal handler then hands control 711 to special code in the software emulator 712 for emulating the response of the system to an illegal procedure. The program that is in process cannot continue in normal fashion, so the illegal procedure fault will inform the operating system the program has faulted when normal emulation is continue 713.

Figure 8:
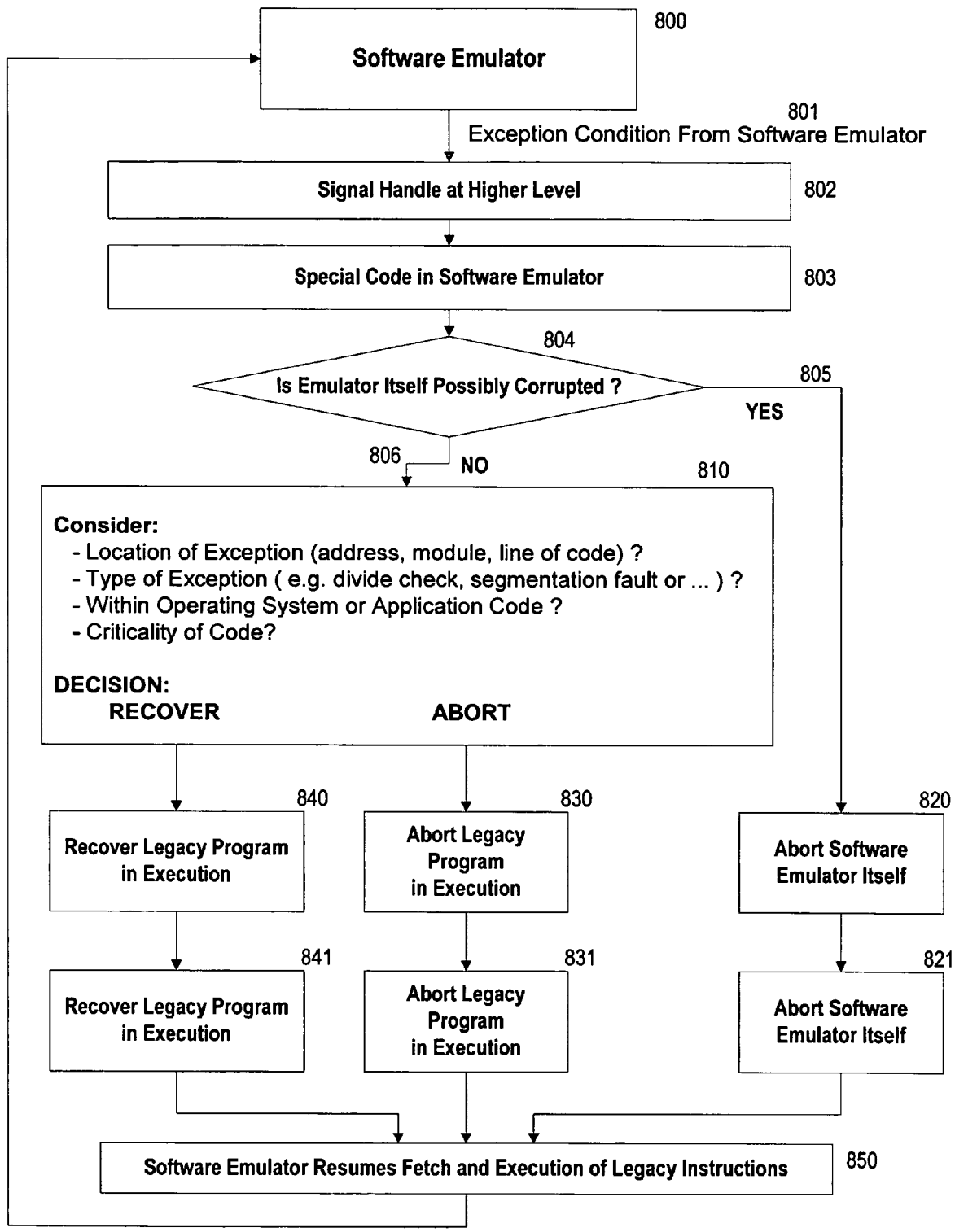
FIG. 8 is a diagram illustrating the determination of whether a signaled condition detected while running the emulation software should cause an abort, or recovery and resumption of emulation on behalf of the same program.

FIG. 8 is a diagram illustrating the determination of whether a signaled condition detected while running the emulation software should cause an abort, or recovery and resumption of emulation on behalf of the same program. The overriding principle in making the decision is whether emulation can be safely resumed with a minimal chance of system level data corruption, or corruption of the variables of the emulation code itself. If there is any significant chance of data corruption without detection, then the program being emulated should be aborted. If there is any significant chance of the emulator itself being corrupted then the emulation should abort itself. In a mainframe system, this is akin to a central processor detecting a hardware error. In an emulated central processor unit, this means that the software program or thread of execution relating to a specific processor must be restarted. Referring to FIG. 8, the software emulator in normal operation is marked as 800. As long as no exception occurs the software emulator 800 continues processing legacy system instructions. If an exception condition occurs 801 then control is given to a higher level signal handler 802. The signal handler determines which host system program was in execution at the time of the exception and then passes control to special code which is part of the software emulator 803. The mechanism for signal handling procedures is well known by those current in the state of the art for system level programming. The first determination that must be made is whether the exception condition indicates that the software emulator itself may be possibly corrupted 804. If there is a possible corruption 805 the software emulator itself must be aborted 820, and then if proper, the software emulator or a thread for the CPU will be reloaded and restarted in memory 821. The software emulator then proceeds with normal legacy instruction processing 850.

Continuing in reference to FIG. 8, if the software emulator itself is not in significant danger of corruption 806, then several other factors are considered 810 such as the type of exception condition, the location in memory of the host system instruction, whether or not the instruction is part of the host system operating system, a judgment as to the criticality of the code being emulated, and determining if the code is a lower level application program or not. Based on this information the legacy system program can be recovered 840 or aborted 830. If recovery is decided upon the software emulator will emulate the response of the legacy system hardware 841 and then resume legacy instruction processing 850. If recovery is not decided upon the software emulator will signal the legacy system operating system that an illegal procedure has been encountered and give control to the legacy operating system to abort the program in question 831. Normal legacy instruction processing then resumes 850.

In the overall picture there are several things that must be put in place to accomplish the overall goal which is to improve performance. The basic approach for achieving the performance increase is to eliminate code and checking from the most time-critical sections of the software emulator. In order to eliminate these checks, an alternative method which in the end provides the same or very much the same functional result must be identified. As part of this invention the exception checking mechanisms of the host system hardware, in conjunction with the signal handler of the host system's operating system provide the basis for an alternative checking mechanism. In order for this to be applied it is necessary that the host system exception checking "cover" all aspects of the checking that is being eliminated in the software emulator. That is, the same errors must be caught with the new mechanism as with the old. It is permissible that the host system exception may provide more or tighter checking of exceptions, because this situation can be analyzed after the exception is detected, and handled in the software emulator's code for recovering from the exception.

The handling of the exceptions is made more complex because it is possible for exceptions by the host system's hardware and software which were not "planned" as part of the performance improvement which is part of this invention. For example, just an ordinary coding error in the software emulator itself may cause a divide check or a segmentation fault to occur. These signals which may occur spontaneously must be distinguished from the signals that occur due to the intention of errors which were "expected" to be found. The mechanism for distinguishing between these errors can be implemented in the signal handler itself, in the special code of the software emulator for handling errors, or in a combined approach. The most useful identifying item is the memory location of the host system instruction which signaled the exception. From this address, the module and the precise location of the fault can be determined.

Another approach to the distinction would be to set a flag or global variable which could be used by the signal handler to determine if a certain type of fault was expected. This flag would be "set" just before the instruction or line of code which could cause the fault in question, and the "reset" just after.

The alternatives for handling all of the special conditions and determining a satisfactory recovery mechanism for the faults found by the signal handler in this invention are easily understood by those skilled in the art.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. An apparatus for providing improved emulation performance while emulating in software the hardware and operations of a legacy computer system, utilizing an emulation software program running on a host computer system, the host computer system including a host system operating system, a host central processing unit and a host system memory, the emulation software program residing in the host system memory and including:
   A) separate first and second emulation code each for emulating at least one legacy system instruction of a plurality of legacy system instructions the first and second emulation code both being a part of the emulation software program and stored in separate areas of memory within the host system memory;
   B) the first emulation code comprising first code for performing emulation of the one legacy system instruction;
   C) a signal handler which is given control of the software emulation program, by the host operating system during emulation of the one legacy system instruction by the first emulation code in response to a first host system hardware detected exception condition; and enables recovery by returning control to the second emulation code in the software emulation program;
   D) the second emulation code comprising a first mechanism for taking control from the signal handler and recovering from the exception condition; the second emulation code further comprising both: 1) code for completing emulation of the same one legacy instruction in the same manner as the legacy hardware system; and, 2) code for performing checks not included in the first emulation code, processing of the code for performing checks thereby avoiding occurrence of any further host system hardware detected exception conditions.

2. The apparatus of claim 1 further including in the second emulation code:
   A) a second mechanism for determining an address of a machine instruction within the software emulation program that caused the exception condition;
   B) a third mechanism for identifying the one legacy system instruction being emulated based upon the address of the machine instruction provided by the second mechanism; and
   C) a fourth mechanism for utilizing that identification of which one legacy system instruction was being emulated provided by the third mechanism for enabling the emulation software program to respond and recover from the exception condition.

3. The apparatus of claim 1 further including a mechanism for communicating from the first emulation code to the second emulation code, an information utilized in responding to the exception condition.

4. The apparatus of claim 1 wherein the host system memory includes a target system memory and the plurality of legacy system instructions are contained within that target system memory.

5. A process for emulating in software the hardware and operations of a target computer system, with an emulation software program running on a host computer system, the host computer system including a host system operating system, a host central processing unit and a host system memory, the process comprising the steps of:

A) the emulation software program utilizing first emulation code to emulate one legacy system instruction from a plurality of target system instructions contained within said host system memory;

B) during said emulation by the first emulation code, a signal handler included in the host operating system catching control of the software emulation program as a result of a host system hardware detected exception condition and transferring control to second emulation code in the emulation software program;

C) the second emulation code receiving control and completing emulation of the one legacy system instruction in a manner that provides results which are the same as would have been achieved by the legacy hardware system for that same instruction;

D) during that completion of emulation of the one legacy system instruction by the second emulation code performing checks for potential exception conditions utilizing code not included in similar form in the first emulation code and in a manner avoiding any further occurrence of the host system hardware detected exception condition during execution of the emulation code for completing emulation of that one legacy system instruction; and, E) the emulation software program then continuing with emulation of a subsequent target system legacy instruction from the plurality of target system instructions utilizing the first emulation code.

* * * * *